Feb. 21, 1956 M. E. GILBERT 2,735,358
CHARCOAL BROILER GRILL
Filed June 10, 1953 3 Sheets-Sheet 1

INVENTOR.
Maxon E. Gilbert
BY
Barlow & Barlow
ATTORNEYS.

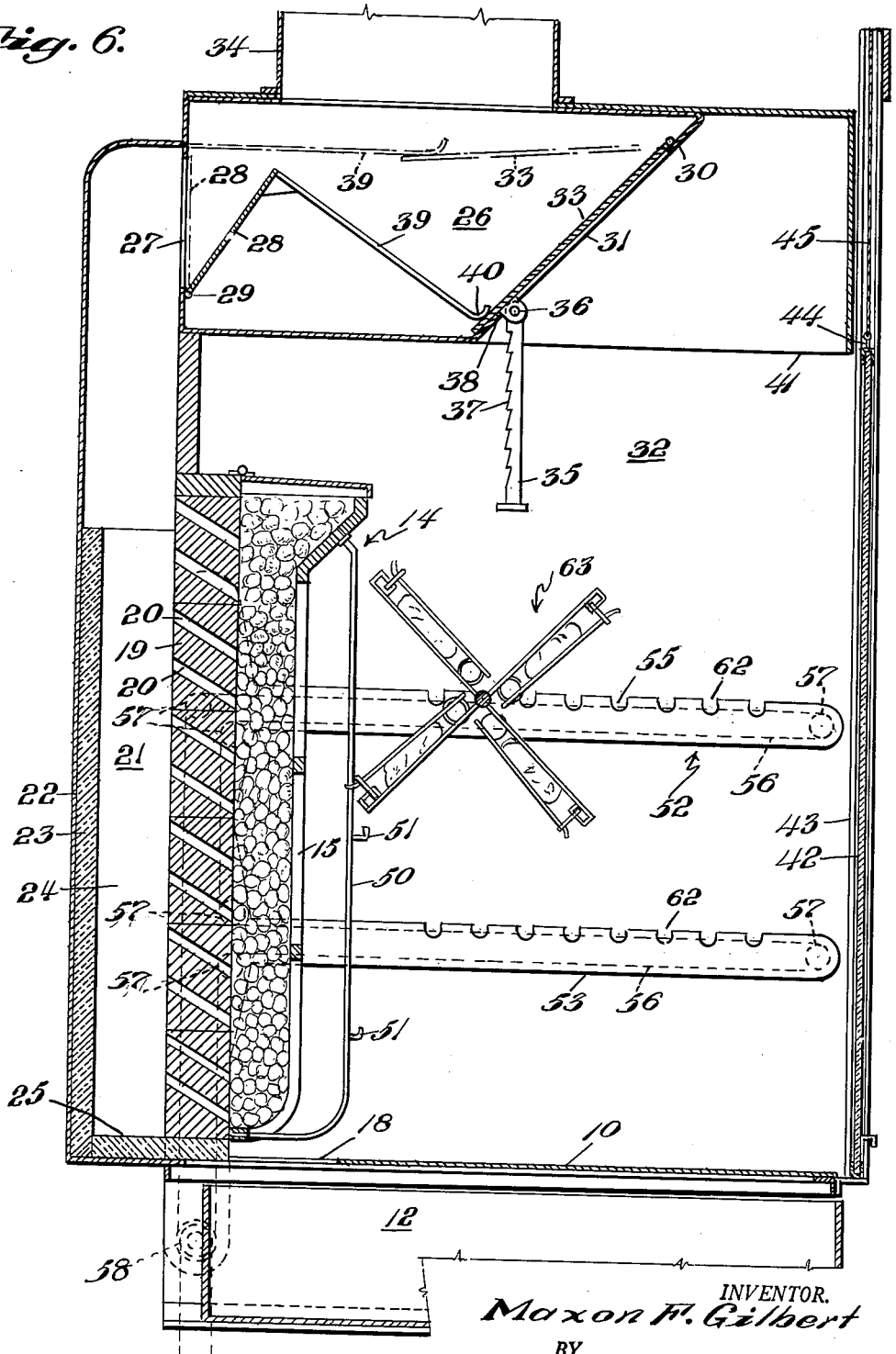

Feb. 21, 1956 M. E. GILBERT 2,735,358
CHARCOAL BROILER GRILL
Filed June 10, 1953 3 Sheets-Sheet 3
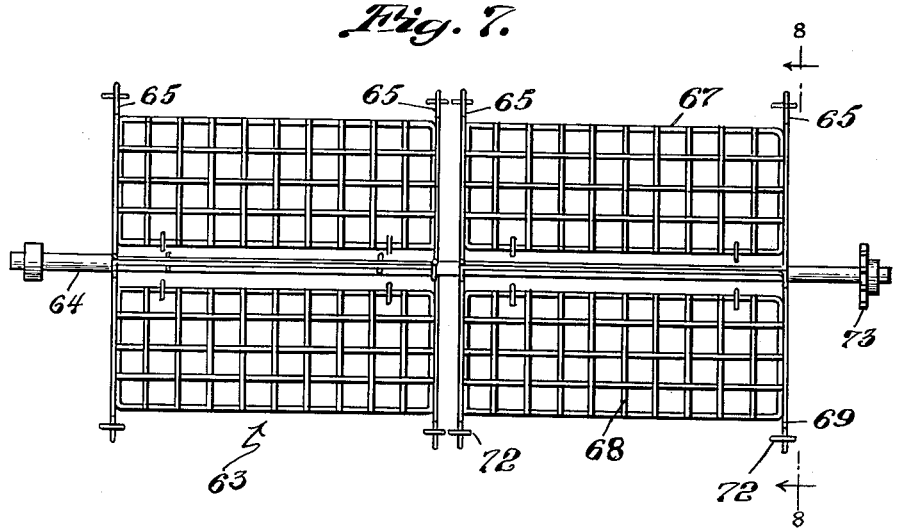
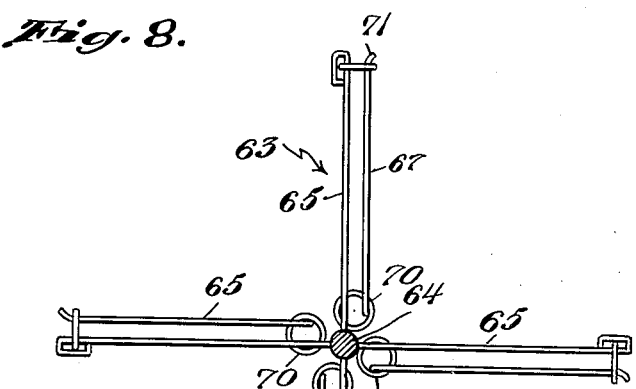
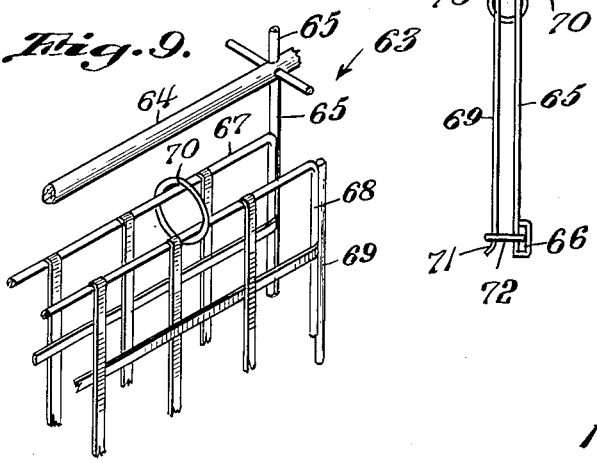
INVENTOR.
Maxon E. Gilbert
BY
Barlow & Barlow
ATTORNEYS.

United States Patent Office 2,735,358
Patented Feb. 21, 1956

2,735,358

CHARCOAL BROILER GRILL

Maxon E. Gilbert, North Scituate, R. I.

Application June 10, 1953, Serial No. 360,759

7 Claims. (Cl. 99—427)

This invention relates to improvements in a charcoal broiler grill apparatus for cooking meats by exposure to live coals.

It is usual in many restaurants to place the broiler grill apparatus at some conspicuous location within the restaurant for the patrons to view the food processed in order to induce patronage to food cooked by the apparatus. Such machines consequently are self-contained having a hood in communication with the atmosphere for carrying off the grease-laden smoke and odor of the cooking meats. The greases collect within the flue connection to the head where they are difficult to reach for removal and become a fire hazard. The usual apparatus is also usually limited to one type of cooking.

An object of the invention is to provide a broiler grill apparatus so constructed as to eliminate the disadvantages above referred to.

Another object of the invention is to provide a broiler grill apparatus in which a grease trap will be provided which is readily accessible for the removal of grease collected therein.

Another object of the invention is to provide a broiler apparatus in which the draft for the fuel may be controlled in a manner so that fuel may be maintained at any degree of combustion from a slow combustion to that to produce maximum temperature of the fuel.

Another object of the invention is to provide a broiler apparatus in which meats, such as steaks, chops, and the like, may be broiled at the same time that meat may be cooking by being rotated before the burning coals.

Another object of the invention is to provide a broiler apparatus in which meat may be cooked by rotating at any of a plurality of distances from the burning coals.

A more specific object of the invention is to provide a broiler apparatus so constructed as to make the same practical for use for cooking meats requiring different technique in cooking in front of live coals.

Another specific object is to provide an endless chain drive for rotating a meat holder provided with a sprocket wheel which may be placed into driven engagement with the chain at various locations along the same.

With these and other objects in view, the invention consists of certain novel features of construction as will be more fully described and particularly pointed out in the appended claims.

In the accompanying drawings:

Figure 6 is a central sectional view through the apparatus on an enlarged scale;

Figure 7 is an elevational view of a modified spit for holding a plurality of portions of meat for rotating the same in front of burning coals;

Figure 8 is an edge elevational view of the device shown in Figure 7; and

Figure 9 is a perspective view of a fragmental portion of the spit shown in Figure 7.

The broiler apparatus according to the invention has a vertically extending fuel box or compartment, the front of which is grilled to expose the burning units of a charcoal fuel. Steak, chops, and the like are held in front of the fire box by means of holders which are held stationary next to the fire box and such meat which requires rotating action in front of the coals is supported on a modified spit for holding a plurality of meat portions. Thus, both types of cooking may be practiced simultaneously in front of the coals. The apparatus has a hood which is in communication with the atmosphere through a grease trap chamber which in turn is also in communication with the atmosphere within the room in which the apparatus may be and also is in communication with the fuel box. The admission to the grease trap is controlled by a set of dampers which are arranged to operate in conjunction one with the other in a manner such that when one is in the open position, the other is closed and proportionally at intermediate position from the closed to the open position. Thus, a direct or maximum draft may be applied to the fuel, and the fuel will by very quickly brought to its maximum temperature, or a minimum draft may be applied to the fuel to maintain slow combustion during lull periods of trade. Thus, a single apparatus of a capacity sufficient to meet the maximum demand of the trade of the restaurant during rush periods may be economically operated during the usual lull in trade.

Figure 1:
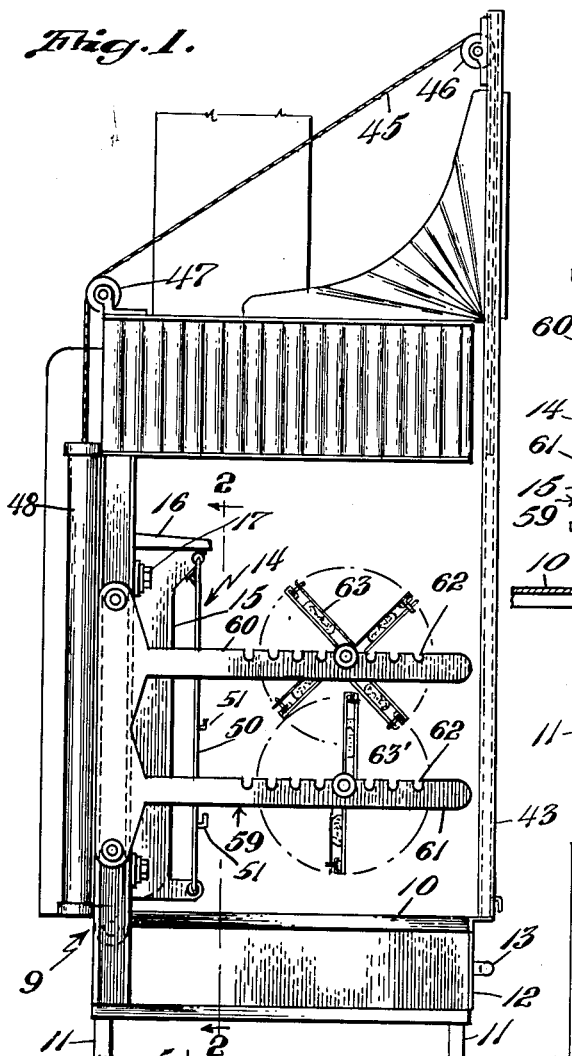
Figure 1 is a side elevational view of a broiler apparatus embodying my invention.
Figure 2:
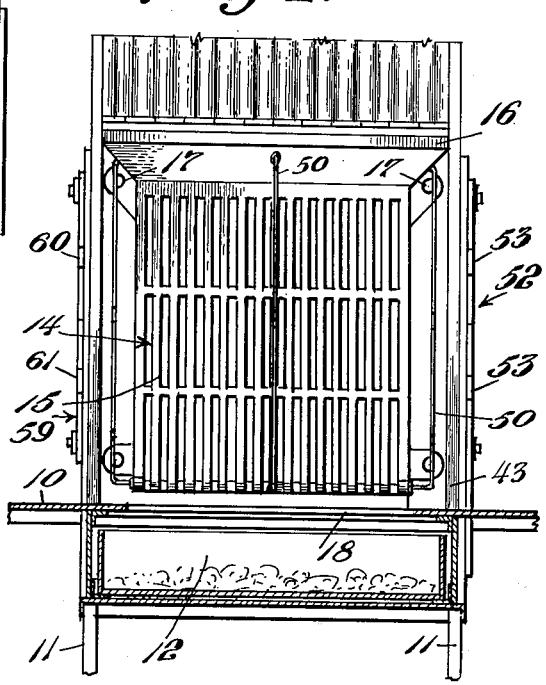
Figure 2 is a sectional view of a fragmental portion of the apparatus shown in Figure 1 taken substantially along line 2—2 of Figure 1.

Referring to the drawings (see Figure 1), the casing 9 of the broiler machine is of generally open frame structure providing a counter 10 which is supported on legs 11 and having an ash drawer 12 slidably mounted beneath the said counter 10 and provided with a handle 13 to pull the drawer open from the front of the machine. The fuel compartment is formed by means of a fuel basket or charcoal box 14 having a grated generally vertical front side 15 and a top closure 16. The basket is secured by means of bolts 17 to the casing at a location inwardly of the rear side of the casing and projects to overhang above the adjacent side of the counter 10 in which an opening 18 (see Figures 2 and 6) is provided to be in register with the bottom end of the box 14 for the ash therefrom to fall or drop through said opening into the ash drawer 12. The rear or back of the fuel compartment is closed by fire bricks 19 (Figure 6), each of which is provided with upwardly inclined openings 20 extending therethrough from the fire box to open into a chamber or flue 21 formed by the space between the fire box and back 22 of the casing. Heat insulation material 23 is positioned against the inner side of the back 22 to the height of the fire box and also at the sides 24 and at the bottom 25. The flue 21 is in communication with a grease trap chamber 26 by means of an opening 27 which is controlled by a closure or damper 28 hingedly secured as at 29 for movement to and from said opening 27. The chamber 26 extends horizontally above the fuel compartment 14 and has an upwardly inclined front wall 30 provided with an opening 31 in communication with the space or cooking chamber 32 and to the atmosphere through the open sides of said chamber 32. The opening 31 is controlled by a second closure or damper 33 which is hingedly secured to the upper edge of the opening 31 for swinging movement to and from said opening 31. The chamber 26 has a stack 34 which is placed in communication with the outside atmosphere and is of a sufficient height to cause a draft or ejection action in chamber 26, or the stack may have a fan blower or the like (not shown) to cause a sufficient draft when found necessary. The second damper 33 has a handle 35 pivotally attached thereto as at 36 and a notched edge 37, which, when the damper 33 is swung inwardly, will be adapted to engage the lower edge 38 of the opening 31 to retain the said damper in the adjusted open position thereof. There is secured at each marginal side edge of the first damper 28 an arm 39 which extends toward the second damper 33 and has an arcuate end 40 which is adapted to bear against the damper 33. The arms 39 over-balance the damper 28 in a direction tending to move the same to open position, and are of a length such that when the second damper 33 is in the closed position, the first damper will be in open position and the arcuate end 40 bearing against the said second damper. Upon opening of the second damper 33, the same will through arms 39 move the first damper 28 to closed position as indicated in dot-dash lines (see Figure 6). Thus, any degree of opening of the second damper 33 will produce a relatively proportional closing of the first damper 28. In practice the damper 33 is normally open to draw from the cooking chamber and surrounding atmosphere. When it is required that the fire be livened up, the damper 33 is closed, which opens damper 28 to draw directly through the fire box through openings 20. A hood 41 extends about the upper part of the machine to enclose and direct the rising grease-laden smoke and odor from the cooking chamber to the grease trap chamber.

The front of the cooking chamber is closed by a glass window 42 which is slidably mounted in grooved uprights 43 and has attached to the upper edge spaced hooks or the like 44 from each of which extends a flexible cable 45 guided over pulley 46, 47 (see Figure 1) and thence to be attached to a counter-weight balanced device 48 whereby the window 42 may be raised to such heights as desired and maintained raised by the said counter-weight devices 48. Access to the cooking chamber and fuel compartment may be readily had through the open sides of the chamber and which sides may if desired be also glass-enclosed (not shown) in the manner similar to the front glass closure.

In order to provide for supporting meat to be cooked before the burning coals, vertically disposed rods 50 are secured to the fire box to extend in front thereof, and these are provided with spaced hooks 51 with the hooks on one rod in line with the hooks on the other rods whereby to hold thereon stationary meat holders to expose the meat to the said live coals.

Figure 3:
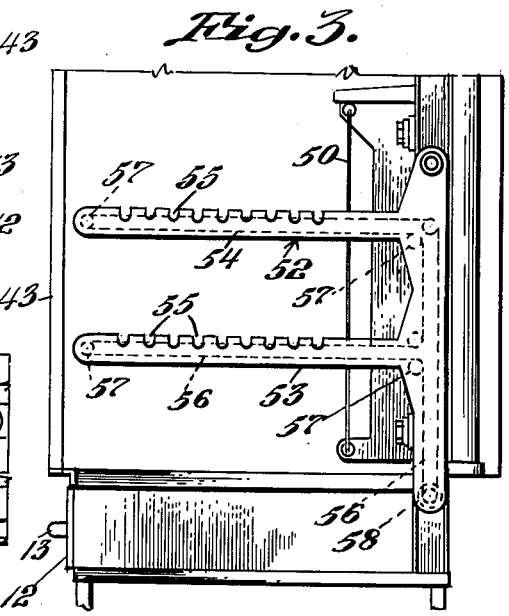
Figure 3 is an elevational view of a fragmental portion of the opposite side of the machine from that shown in Figure 1.
Figure 4:
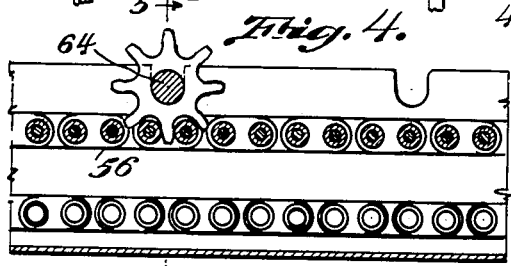
Figure 4 is a sectional view on an enlarged scale of a fragmental portion of a supporting arm and drive for a rotating spit or meat holder.
Figure 5:
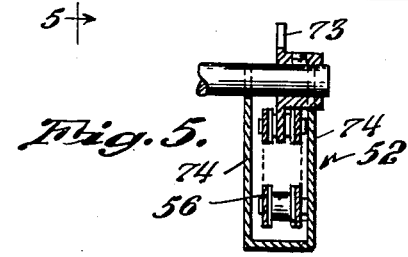
Figure 5 is a sectional view taken substantially along lines 5—5 of Figure 4 looking in the direction of the arrows thereon.

There is mounted on one side of the machine a bearing member 52 (see Figure 2) which has a pair of horizontally extending arms 53 and 54 similar to each other and provided with a plurality of bearing openings or slots 55 extending inwardly from the upper edge of the arms. These arms are positioned opposite the open side of the cooking chamber. The member 52 (see Figures 4 and 5) is made of hollow sheet metal construction and houses an endless roller chain 56 which is guided over guide rollers 57 (see Figures 3 and 6) and over a sprocket wheel 58 by means of which the chain is driven and which sprocket wheel in turn may be driven as by means of a motor (not shown). A bearing member 49 (see Figures 1 and 2) is mounted on the opposite side of the machine with the arms 60, 61 thereof in line with the arms 54, 53, respectively, and has bearing slots 62 in line with the bearing slots 55. This member 59 is substantially similar to member 52 with the exception that it has no drive chain and merely serves as a support.

A spit or modified meat holder 63 (see Figures 7 to 9) comprises a shaft 64 to which is fixed as by welding a plurality of radially extending rods 65, the free ends of which terminate in a closed loop 66 (Figure 8). These rods extend at right angles to each other and in pairs axially of the shaft. Thus, there is provided eight pairs of rods 65 about the shaft. A grill-like plate 67 (see Figure 9) is supported between each pair of rods 65 and secured thereto as by means of a welding joint. A similar plate 68 is provided opposite to the plate 67 and is hingedly attached as by means of rings 70 to the inner edge of a plate 67 for swinging movement to and from the plate 67. The plate 67 has side rods 69 which project beyond the outer edge of the plate 68, and the end portions are curved outwardly as at 71 and in line with the pair of rods 65. A meat portion to be cooked is positioned between a pair of plates 67, 68, and the plates are held in the closed position on the meat by a ring or latch 72 extending from the loop 66 and over the arcuate ends of the rods 69. Thus, eight portions of meat, which may be half-chicken broilers, may be held in the holder 63.

The shaft 64 is adapted to be received and rotatably supported in any pair of aligned openings or slots 55, 62 to position the meat-holding plates at different distances in front of the grated front 15. The shaft carries a sprocket wheel 73 which is received between the sides 74 of the arms of the member 52 (see Figures 4 and 5) to engage and be rotated by the roller chain 56. Thus, a choice of distances is provided for the meat holder 63 in front of the burning coals. The arrangement provides for a holder 63 to be supported on the upper arms 54, 60 and a similar holder 63' to be supported on the lower arms 53, 61 (see Figure 1), whereby two holders 63 may be placed in operation with the grill plates of each holder passing each other in the manner of gear teeth, thus simultaneously cooking a plurality of sixteen portions of meat. During the time for cooking meat on holders 63 other meat portions may be held stationary in front of the coals.

It will be now apparent that I have disclosed a broiler apparatus wherein meat portions requiring different cooking technique before burning charcoal may be positioned simultaneously and in which the combustion of the fuel may be controlled in a manner for the economical operation of the apparatus at various periods and demands thereon. Thus, the burning coals may be enlivened for broiling a steak or chops and the spits removed to a further distance from the enlivened coals if found necessary during the cooking of the meat held stationary in front of the coals.

I claim:

1. A broiler apparatus for cooking meats by exposure to burning fuel comprising stationary meat holders, a casing having a cooking chamber provided at its front with grooved uprights, a transparent closure slidably mounted within the grooves of said uprights, a fuel basket at the rear side of said chamber opposite to said transparent closure and provided with a vertically disposed grated front opening into said chamber for exposing the burning coals within said basket and a support carried by said grated front for supporting and holding stationary meat holders positioned in front of the said grated front.

2. A broiler apparatus for cooking meats by exposure to burning fuel comprising stationary meat holders, a casing having a cooking chamber provided at its front with spaced grooved uprights, a transparent closure slidably mounted within the grooves of said uprights, a counterweight device operatively connected to said closure whereby the same may be raised and maintained in the raised position by said counter-weight, a fuel basket at the rear of said chamber and provided with a vertically disposed grated front opening into said chamber for exposing the burning coals within said basket and a support carried by said grated front for supporting and holding stationary meat holders positioned against said grated front of the fire compartment.

3. A broiler apparatus for cooking meats by exposure to burning fuel comprising a casing having a cooking chamber, a fuel compartment at the rear of said chamber and provided with a grated front opening into said chamber and against which meat holders may rest to expose the meat to the burning coals in said compartment, said compartment having a plurality of openings through the rear side thereof at spaced intervals from the lower end of said compartment to the upper end thereof in a general lateral direction, a flue in communication with the said openings and in communication with the atmosphere and a damper for controlling the draft through said flue.

4. A broiler apparatus for cooking meats by exposure to burning fuel comprising stationary meat holders, a casing having a cooking chamber closed at the front and open at the sides, a fuel compartment at the rear of said chamber and provided with a grated front opening into said chamber and against which meat holders may rest to expose the meat to the burning coals in said compartment, a flue at the rear of said compartment, said compartment having a rear wall provided with an opening therethrough opening into said flue, a grease trap at a location above said cooking chamber and in communication therewith and with said flue, a first damper for controlling the communication between said grease trap and said flue, a second damper for controlling the communication between said chamber and said grease trap, each of said dampers being mounted for swinging movement inwardly of said grease trap and in opposite directions to each other for opening and closing movement thereof and an arm on said first damper extending into engagement with said second damper whereby movement of the said second damper will be transmitted to said first damper.

5. A broiler as set forth in claim 4 wherein said grease trap has an opening to said flue and an opening to said chamber, and said first damper is hinged about an edge of the first said opening and gravity moved to open position, and said second damper is hinged about an edge of the said second opening and manually moved to open or closed position.

6. In a broiler apparatus for cooking meats by exposure to a burning charcoal fuel having a casing provided with a vertically extending fuel compartment with a grated front for exposing the burning coals, a support for a rotatable spit comprising a hollow vertically extending member at each side of said fuel compartment and attached to said casing, each of said members having a pair of hollow horizontal arms integrally joined to said member extending toward the front of the casing one above the other and each provided with a plurality of bearing openings with the openings in one pair of arms being aligned with the openings in the other pair of arms, an endless sprocket chain drive housed within one of said members and the arms thereof, guide means within the said one member and the arms thereof for supporting and guiding said chain in its path of movement, and a spit received in any pair of said aligned openings and having a sprocket wheel thereon engageable with the portion of the chain exposed at the chosen opening for rotation of said spit in front of said grated opening.

7. In a broiler apparatus for cooking meats by exposure to burning fuel having a fuel compartment provided with a grated opening for exposing burning coals, and a support on each side of said fuel compartment on one of which an endless chain drive is mounted thereon, a rotatable work holder rotatably supported on said supports and extending into engagement with said drive to be rotated thereby in front of said grated opening, said work holder comprising a plurality of equally spaced clamps between which the work is held, each clamp having a stationary part and a movable part hingedly secured to the said stationary part, and means carried by one of said parts and adapted to engage the other of said parts to hold said parts in clamping relation with the food held therebetween.

References Cited in the file of this patent
UNITED STATES PATENTS

| | | |
|---|---|---|
| 579,987 | Jordan | Apr. 6, 1897 |
| 607,976 | Amos | July 26, 1898 |
| 714,241 | Robbins | Nov. 25, 1902 |
| 868,753 | Barrett | Oct. 22, 1907 |
| 1,051,502 | Klein | Jan. 28, 1913 |
| 1,442,584 | Schey | Jan. 16, 1923 |
| 1,480,119 | Schey | Jan. 8, 1924 |
| 1,701,033 | Elbert | Feb. 5, 1929 |
| 1,860,577 | Hedge | May 31, 1932 |
| 2,399,163 | Brunamonti | Apr. 30, 1946 |
| 2,566,524 | Kammins | Sept. 4, 1951 |
| 2,588,046 | Ridgely | Mar. 4, 1952 |
| 2,655,142 | Phares | Oct. 13, 1953 |